(12) United States Patent
Wang et al.

(10) Patent No.: US 11,915,135 B2
(45) Date of Patent: Feb. 27, 2024

(54) GRAPH OPTIMIZATION METHOD AND APPARATUS FOR NEURAL NETWORK COMPUTATION

(71) Applicant: ZHEJIANG LAB, Hangzhou (CN)

(72) Inventors: Hongsheng Wang, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/950,028

(22) Filed: Sep. 21, 2022

(65) Prior Publication Data

US 2024/0028886 A1   Jan. 25, 2024

Related U.S. Application Data

(63) Continuation of application No. PCT/CN2022/112951, filed on Aug. 17, 2022.

(30) Foreign Application Priority Data

Jul. 25, 2022 (CN) .......................... 202210874564.2

(51) Int. Cl.
*G06N 20/00* (2019.01)
*G06N 3/08* (2023.01)
*G06F 18/20* (2023.01)

(52) U.S. Cl.
CPC ............... *G06N 3/08* (2013.01); *G06F 18/29* (2023.01); *G06N 20/00* (2019.01)

(58) Field of Classification Search
None
See application file for complete search history.

(56) References Cited

U.S. PATENT DOCUMENTS

| 6,026,241 A | 2/2000 | Chow et al. |
| 2022/0198296 A1 | 6/2022 | Liu et al. |

FOREIGN PATENT DOCUMENTS

| CN | 101923472 A | 12/2010 |
| CN | 108446540 A | 8/2018 |

(Continued)

OTHER PUBLICATIONS

Du Wei-Jian, et al. "QingLong: A Neural Network Programming Model Based on Asynchronous Constant and Variable." Chinese Journal of Computers. vol. 43, No. 4, Apr. 15, 2020.

(Continued)

*Primary Examiner* — David R Vincent
(74) *Attorney, Agent, or Firm* — IPro, PLLC (57) ABSTRACT

The disclosure discloses a graph optimization method and apparatus for neural network computation. The graph optimization method includes the following steps: S1: converting a computation graph; S2: allocating a register; S3: defining a route selector for a redefined variable; S4: solving the route selector for the redefined variable; S5: defining a criterion of inserting the route selector for the redefined variable into a node; S6: analyzing a dominating edge set of the node for the redefined variable; S7: inserting the route selector for the redefined variable; and S8: renaming the redefined variable. The disclosure solves the problem of the corresponding route selection on a correct definition of the redefined variable when a node including the redefined variable in a computation graph in the compiling period flows through multiple paths of computation flow, reduces the memory cost and promotes the development of implementation application of a deep neural network model.

14 Claims, 7 Drawing Sheets

(56) References Cited

FOREIGN PATENT DOCUMENTS

| CN | 112084037 A | 12/2020 |
|----|-------------|---------|
| CN | 112084038 A | 12/2020 |
| CN | 114461351 A | 5/2022  |

OTHER PUBLICATIONS

Nils T Siebel. "Accelerating neuro-evolution by compilation to native machine code." The 2010 International Joint Conference on Neural Networks (IJCNN). Oct. 14, 2010.
Wu Jing. "Research on Static Single Assignment Optimization Technique Based on GCC." A dissertation for the Degree of M. Eng. Harbin Engineering University. Jan. 2006.

GRAPH OPTIMIZATION METHOD AND APPARATUS FOR NEURAL NETWORK COMPUTATION

CROSS REFERENCE TO RELATED APPLICATIONS

The present application claims priority of Chinese Patent Application No. 202210874564.2 filed to the Patent Office of CNIPA on Jul. 25, 2022, entitled "GRAPH OPTIMIZATION METHOD AND APPARATUS FOR NEURAL NETWORK COMPUTATION", the entire contents of which are incorporated herein by reference.

TECHNICAL FIELD

The disclosure herein relates to the technical field of a computer based on a specific computational model, in particular to a graph compiling and optimization method and apparatus for neural network computation.

BACKGROUND

With the rapid development of industrialization application of the artificial intelligence, a graph compiling and optimization technology for deep neural network model computation increasingly becomes the research hotspot in the academic world and the industrial world.

Therefore, a graph compiling and optimization method and apparatus for neural network computation are proposed.

SUMMARY

The disclosure aims to provide a graph compiling and optimization method and apparatus for neural network computation. When a plurality of nodes in a computation graph in compiling for neural network computation include a redefined variable, the corresponding selection on a correct definition of the redefined variable when the redefined variable faces a multi-path computation flow graph is depended on a path through which execution flow flows in the operation phase of the computation graph. In order to compile and optimize the computation graph including the redefined variable before execution of the computation graph, the disclosure provides a computation graph intermediate representation of graph compiling and optimization in a global single-node defining mode and proposes an insertion criterion and an analysis method of a route selector of a correct definition of a redefined variable. The disclosure solves the problem of the corresponding route selection on the correct definition of the redefined variable when a node including the redefined variable in a computation graph in the compiling period flows through multiple paths of computation flow. According to the disclosure, by simplifying the characteristic of the redefined variable of the node in the computation graph, the graph compiling and optimizing process for neural network computation is simplified, and a better optimization result is obtained. In the process of developing an algorithm model by researchers and engineering users, by utilizing the graph optimization method and apparatus provided by the disclosure, data flow of the computation graph in compiling for neural network computation is simplified, the overall memory cost required by a tensor variable in the data flow is reduced, the requirement of a large model for hardware memory resources is reduced, and the development of implementation application of a deep neural network model is promoted.

The disclosure adopts the following technical solution that:

A graph compiling and optimization method for neural network computation includes the following steps:

S1: compiling and converting a computation graph: converting a neural network computation graph for neural network computation into a computation graph in a global single-node defining mode;

S2: allocating a register of computer memory: allocating the register of computer memory for a variable at a node of the computation graph;

S3: defining a route selector for a redefined variable, and selecting a correct definition of the redefined variable at the node of the computation graph according to a path through which execution flow flows in the operation phase of the computation graph;

S4: solving the route selector for the redefined variable;

S5: defining a compiling criterion of inserting the route selector for the redefined variable into the node;

S6: analyzing a dominating edge set of a node for the redefined variable;

S7: inserting the route selector for the redefined variable; and

S8: renaming the redefined variable.

Further, the step S1 specifically includes the following sub-steps:

S11: recording a name of a variable defined at a start node of the neural network computation graph for neural network computation where all variables are located; and S12: compiling and traversing the neural network computation graph for neural network computation according to a topological sequence of the neural network computation graph for neural network computation, and whenever a successor node redefining the variable exists, generating a new name for the variable to obtain the computation graph in the global single-node defining mode.

Further, the step S2 specifically includes the following sub-steps:

S21: analyzing a life cycle of the variable at the node of the computation graph; and S22: allocating the register of computer memory for the variable according to the life cycle, and when the life cycle corresponding to the variable has no conflict, enabling the variable with the non-conflict life cycle to multiplex the same register of computer memory.

Further, in the step S3, in the computation graph intermediate representation, during the corresponding selection of a correct route when the redefined variable faces multiple paths of computation flow, the route selector is inserted at a junction of the multiple paths of computation flow of the redefined variable, and the correct definition of the redefined variable is matched by utilizing the route selector.

Further, the step S3 of defining the route selector for the redefined variable includes the following definitions:

defining a condition of inserting the route selector;

defining a dominance attribute of the computation graph; and defining the rigorous computation graph.

Further, defining the condition of inserting the route selector specifically is that: when a predecessor node of a junction node of multiple paths of computation flow of the computation graph constitutes two or more different sub-graphs and each of the sub-graphs includes a definition node of the redefined variable, a condition 1 and a condition 2 are simultaneously satisfied and the route selector for the redefined variable is inserted at the definition node of the redefined variable of the computation graph;

The condition 1 is that connecting edges exist between the different sub-graphs and the junction node of multiple paths of computation flow of the computation graph and the connecting edges have a unique common node which is the junction node of multiple paths of computation flow of the computation graph; and The condition 2 is that in one time of execution flow of the computation graph, the junction node of multiple paths of computation flow of the computation graph cannot simultaneously flow through the connecting edges between the different sub-graphs and the junction node of multiple paths of computation flow of the computation graph and can only select one of the connecting edges.

Further, defining the dominance attribute of the computation graph specifically is that: all paths of the execution flow of the computation graph in the process of flowing to a node from a root node of the computation graph pass through the junction node of multiple paths of computation flow of the computation graph.

Further, defining the rigorous computation graph specifically is that:

for a node without the route selector, a definition of the redefined variable certainly exists in a predecessor node to dominate the node; and for a node with the route selector, a plurality of definitions of the redefined variable certainly exist and a corresponding definition of the redefined variable dominates a predecessor node corresponding to the node with the route selector.

Further, the step S4 specifically includes the following sub-steps:

S41: inserting a copy node of the correct definition of the redefined variable at a non-key edge of the computation graph: inserting an output variable of the route selector at the non-key edge of the computation graph to take over the copy node of the correct definition of the redefined variable;

S42: decomposing a key edge of the computation graph: adding a blank node at the key edge of the computation graph;

S43: inserting the copy node of the correct definition of the redefined variable at the key edge of the computation graph: inserting the output variable of the route selector at the position of a predecessor node of the blank node in the step S42 to take over the copy node of the correct definition of the redefined variable; and S44: removing the node with the route selector inserted at the junction of multiple paths of computation flow in the computation graph: when the route selector of the correct definition of the redefined variable is de-structured by the step S42 and the step S43, inserting a correct definition node of the redefined variable into the predecessor node corresponding to the junction node of the multiple paths of computation flow.

Further, the step S5 specifically includes the following sub-steps:

S51: defining that a node $V_1$ rigorously dominates a node $V_2$, wherein the node $V_1$ dominates the node $V_2$, the node $V_1$ is a predecessor node of the node $V_2$, and $V_1 \neq V_2$; and S52: defining a dominating edge of the node $V_1$, the dominating edge including a set of all nodes $V_i$ that satisfy the following conditions: the node $V_1$ dominates a predecessor node of the node $V_i$, and the node $V_1$ does not rigorously dominate the node $V_i$.

Further, the step S6 specifically includes the following sub-steps:

S61: analyzing a dominating edge of the start node including the redefined variable, an insertion position of the route selector for the redefined variable at the random node being a dominating edge set of the nodes; and S62: iterating a successor node of the start node until no node requires the route selector for the redefined variable.

Further, the step S7 specifically includes: when a node includes the correct definition of any one redefined variable, inserting one route selector for the redefined variable at any node at the dominating edge of the any one redefined variable.

Further, the step S8 specifically includes: carrying out renaming on a variable output by the inserted route selector for the redefined variable.

The disclosure further provides a graph compiling and optimization apparatus for neural network computation, including a memory and one or more processors, an executable code being stored in the memory, and the one or more processor being configured to implement the graph compiling and optimization method for neural network computation according to any one of the embodiments above when executing the executable code.

The disclosure further provides a computer readable storage medium storing a program. When the program is executed by a processor, the graph compiling and optimization method for neural network computation according to any one of the embodiments above is implemented.

The disclosure has the beneficial effects that: the disclosure solves the problem of the corresponding selection on the correct definition when the redefined variable included by a plurality of nodes in the computation graph for neural network computation faces the multi-path computation flow graph, but in a conventional method, it needs to firstly execute the computation graph and select a correct definition corresponding to the redefined variable according to the path through which the execution flow actually flows. The disclosure provides the graph optimization method in the compiling period for the computation graph including the redefined variable, provides a computation graph intermediate representation of graph optimization in a global single-node defining mode, and solves the problem of the corresponding route selection on the correct definition of the redefined variable when the node including the redefined variable in the computation graph flows through multiple paths of computation flow in the compiling period of the computation graph. The structure of the data flow of the computation graph in compiling for neural network computation is simplified, the overall memory cost required by the tensor variable in the data flow is reduced, and the requirement of the large model for the hardware memory resources is reduced. By a data flowing method for neural network computation provided by the disclosure, the computation efficiency of the entire computation graph is improved and the hardware and time cost is saved.

DETAILED DESCRIPTION

The description below on at least one exemplary embodiment actually is merely illustrative and definitely is not intended to make any limit to the disclosure and application or use thereof. Based on the embodiments in the disclosure, those ordinary skilled in the art can obtain other embodiment(s), without any inventive work, which should be within the scope of protection of the disclosure.

Figure 1:
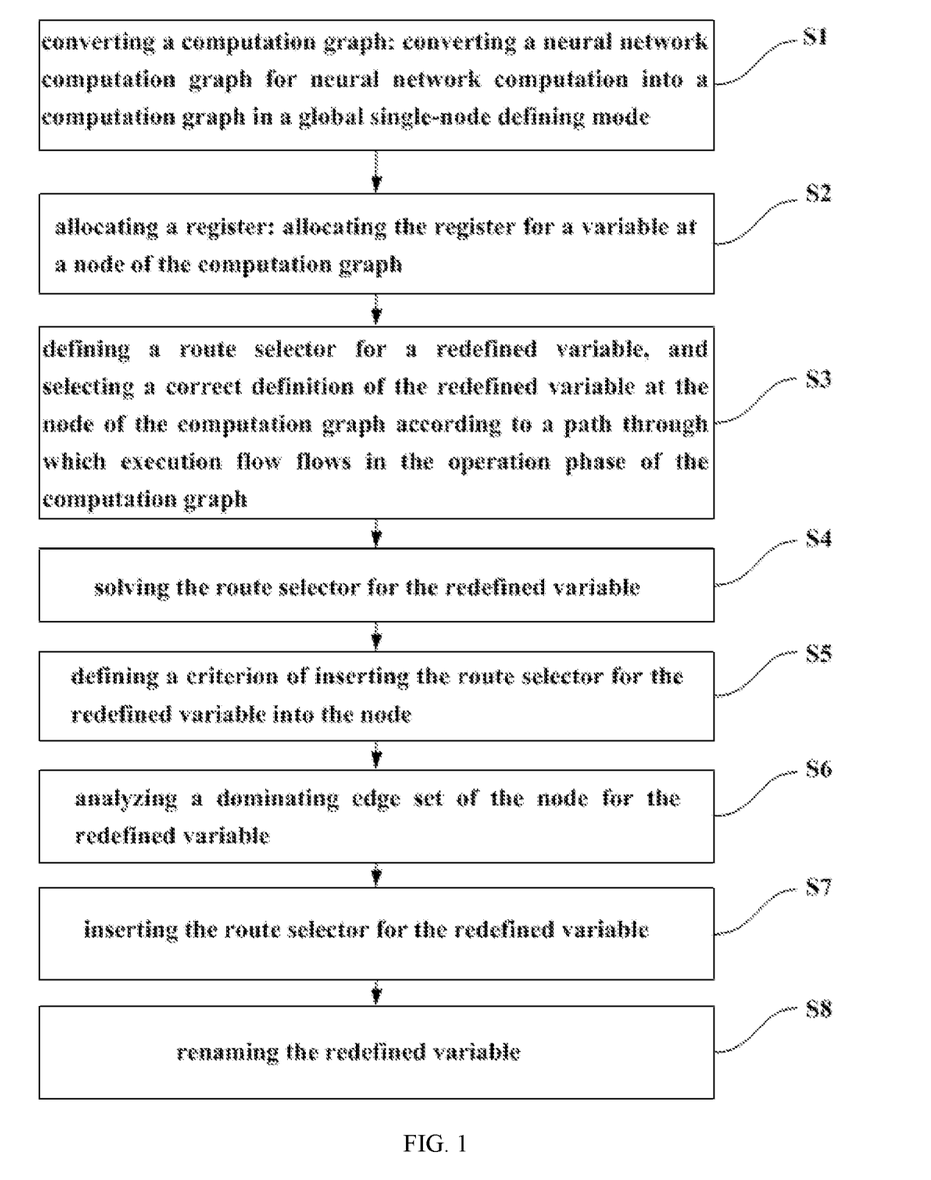
FIG. 1 is a flow chart of a graph compiling and optimization method for neural network computation according to the disclosure.

With reference to FIG. 1, a graph compiling and optimization method for neural network computation includes the following steps:

S1: a computation graph is converted: a neural network computation graph for neural network computation is converted into a computation graph in a global single-node defining mode;

S11: a name of a variable defined at a start node of the neural network computation graph for neural network computation where all variables are located is recorded; and S12: the neural network computation graph for neural network computation is compiled and traversed according to a topological sequence of the neural network computation graph for neural network computation, and whenever a successor node redefining the variable exists, a new name is generated for the variable to obtain the computation graph in the global single-node defining mode.

S2: a register of computer memory is allocated: the register of computer memory is allocated for the variable at the node of the computation graph; hereafter a/the register has the same meaning as a/the register of computer memory.

S21: a life cycle of the variable at the node of the computation graph is analyzed; and S22: the register is allocated for the variable according to the life cycle, and when the life cycle corresponding to the variable has no conflict, the variable with the non-conflict life cycle multiplexes the same register.

S3: a route selector for a redefined variable is defined, and a correct definition of the redefined variable at the node of the computation graph is selected according to a path through which execution flow flows in the operation phase of the computation graph.

In the computation graph intermediate representation, during the corresponding selection of a correct route when the redefined variable faces multiple paths of computation flow, the route selector is inserted at a junction of the multiple paths of computation flow of the redefined variable, and the correct definition of the redefined variable is matched by utilizing the route selector;

Defining the route selector for the redefined variable includes the following definitions:

A condition of inserting the route selector is defined;

When a predecessor node of a junction node of multiple paths of computation flow of the computation graph constitutes two or more different sub-graphs and each of the sub-graphs includes a definition node of the redefined variable, a condition 1 and a condition 2 are simultaneously satisfied and the route selector for the redefined variable is inserted at the definition node of the redefined variable of the computation graph;

The condition 1 is that connecting edges exist between the different sub-graphs and the junction node of multiple paths of computation flow of the computation graph and the connecting edges have a unique common node which is the junction node of multiple paths of computation flow of the computation graph; and The condition 2 is that in one time of execution flow of the computation graph, the junction node of multiple paths of computation flow of the computation graph cannot simultaneously flow through the connecting edges between the different sub-graphs and the junction node of multiple paths of computation flow of the computation graph and can only select one of the connecting edges.

A dominance attribute of the computation graph is defined; and

All paths of the execution flow of the computation graph in the process of flowing to a node from a root node of the computation graph pass through the junction node of multiple paths of computation flow of the computation graph.

The rigorous computation graph is defined;

For a node without the route selector, a definition of the redefined variable certainly exists in a predecessor node to dominate the node; and For a node with the route selector, a plurality of definitions of the redefined variable certainly exist and a corresponding definition of the redefined variable dominates a predecessor node corresponding to the node with the route selector.

S4: the route selector for the redefined variable is solved;
S41: a copy node of the correct definition of the redefined variable is inserted at a non-key edge of the computation graph: an output variable of the route selector is inserted at the non-key edge of the computation graph to take over the copy node of the correct definition of the redefined variable;
S42: a key edge of the computation graph is decomposed: a blank node is added at the key edge of the computation graph;
S43: the copy node of the correct definition of the redefined variable is inserted at the key edge of the computation graph: the output variable of the route selector is inserted at the position of a predecessor node of the blank node in the step S42 to take over the copy node of the correct definition of the redefined variable; and
S44: the node with the route selector inserted at the junction of multiple paths of computation flow in the computation graph is removed: when the route selector of the correct definition of the redefined variable is de-structured by the step S42 and the step S43, a correct definition node of the redefined variable is inserted into the predecessor node corresponding to the junction node of the multiple paths of computation flow.
S5: a criterion of inserting the route selector for the redefined variable into the node is defined;
S51: it is defined that a node $V_1$ rigorously dominates a node $V_2$; the node $V_1$ dominates the node $V_2$, the node $V_1$ is a predecessor node of the node $V_2$, and $V_1 \neq V_2$; and
S52: a dominating edge of the node $V_1$ is defined: the dominating edge includes a set of all nodes $V_i$ that satisfy the following conditions: the node $V_1$ dominates a predecessor node of the node $V_1$, and the node $V_1$ does not rigorously dominate the node $V_i$.
S6: a dominating edge set of the node for the redefined variable is analyzed;
S61: a dominating edge of the start node including the redefined variable is analyzed, and an insertion position of the route selector for the redefined variable at the random node is a dominating edge set of the nodes; and
S62: a successor node of the start node is iterated until no node requires the route selector for the redefined variable.
S7: the route selector for the redefined variable is inserted;
When a node includes the correct definition of any one redefined variable, one route selector for the redefined variable is inserted at any node at the dominating edge of the any one redefined variable.
S8: the redefined variable is renamed; and
Renaming is carried out on a variable output by the inserted route selector for the redefined variable.

Embodiment

S1: a computation graph is converted: a neural network computation graph for neural network computation is converted into a computation graph in a global single-node defining mode;
S11: a name of a variable defined at a start node of the neural network computation graph for neural network computation where all variables are located is recorded; and
S12: the neural network computation graph for neural network computation is compiled and traversed according to a topological sequence of the neural network computation graph for neural network computation, and whenever a successor node redefining the variable exists, a new name is generated for the variable to obtain the computation graph in the global single-node defining mode.

Figure 2:
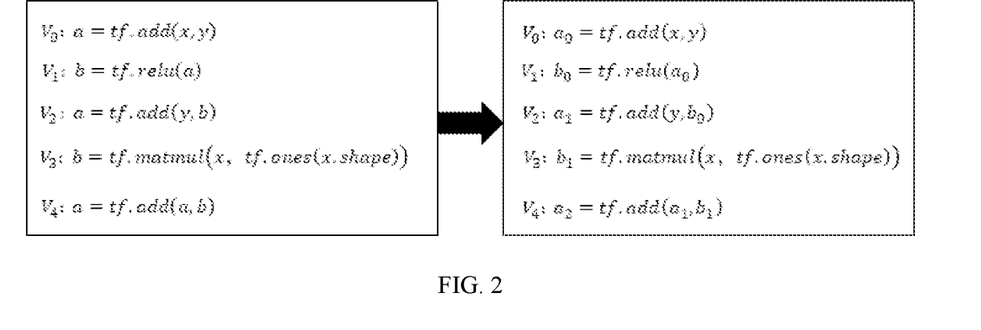
FIG. 2 is a schematic diagram of compiling and converting a neural network computation graph for neural network computation into a computation graph in a global single-node defining mode according to an embodiment of the present disclosure.

With reference to FIG. 2, it is a schematic diagram of compiling and converting a neural network computation graph for neural network computation into a computation graph in a global single-node defining mode. Firstly, a name of a variable a defined at a start node $V_0$ of the computation graph is recorded as $a_0$, and a name of the variable a used at a successor node $V_1$ is updated into $a_0$. The variable a is redefined at a successor node $V_2$, so a life cycle of a variable $a_0$ is from the node $V_0$ to the node $V_1$. In addition, a new name $a_1$ needs to be generated for the variable a at the node $V_2$, and then the name of the variable a used at a successor node $V_4$ is updated into $a_1$. Additionally, the variable a is redefined at the successor node $V_4$, so a life cycle of a variable $a_1$ is from the node $V_2$ to the node $V_4$.

S2: a register is allocated: the register is allocated for the variable at the node of the computation graph;
S21: a life cycle of the variable at the node of the computation graph is analyzed; and
S22: the register is allocated for the variable according to the life cycle, and when the life cycle corresponding to the variable has no conflict, the variable with the non-conflict life cycle multiplexes the same register.

Figure 3:
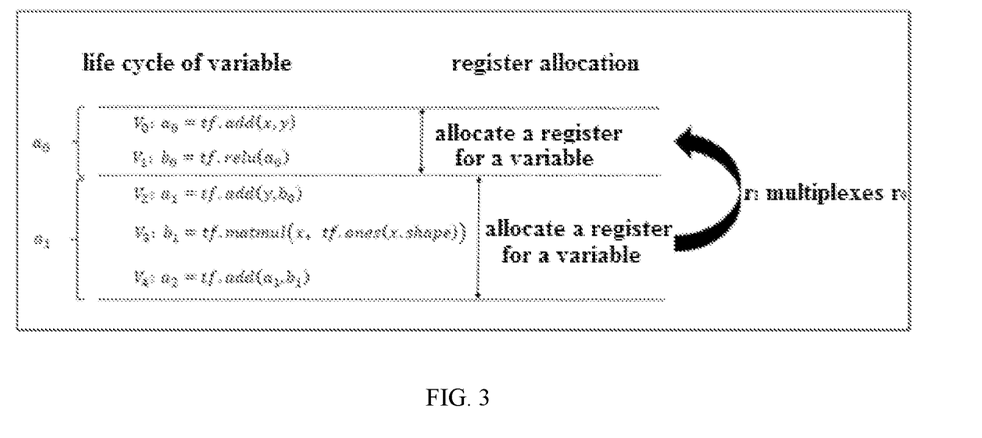
FIG. 3 is a schematic diagram of allocating a register of computer memory for a variable at a node of the computation graph in compiling according to an embodiment of the disclosure.

With reference to FIG. 3, it is a schematic diagram of allocating the register for the variable at the node of the computation graph in compiling, which includes the following process that:
(1) the life cycle of the variable $a_0$ is from the node $V_0$ to the node $V_1$, so a register $r_0$ is allocated for the variable $a_0$ from the node $V_0$ to the node $V_1$ on the computation graph;
(2) the life cycle of the variable $a_1$ is from the node $V_2$ to the node $V_4$, so a register $r_1$ is allocated for the variable $a_1$ from the node $V_2$ to the node $V_4$ on the computation graph; and
(3) the life cycles of the variable $a_0$ and the variable $a_1$ have no conflict, so the register $r_1$ of the variable $a_1$ from the successor node $V_2$ to the successor node $V_4$ can multiplex a memory of the register $r_0$.

S3: a route selector for a redefined variable is defined, and a correct definition of the redefined variable at the node of the computation graph is selected according to a path through which execution flow flows in the operation phase of the computation graph;
The route selector has the semantics of a multiplexer;
In the computation graph intermediate representation, during the corresponding selection of a correct route when the redefined variable faces multiple paths of computation flow, the route selector is inserted at a junction of the multiple paths of computation flow of the redefined variable, and the correct definition of the redefined variable is matched by utilizing the route selector; and For the redefined variable in the node of the computation graph, in the computation graph intermediate representation, the corresponding selection on the correct route when the redefined variable faces a multi-path computation flow graph is depended on the path through which the execution flow flows in the operation phase of the computation graph. Therefore, in order to optimize the computation graph before execution of the computation graph, it needs to insert the route selector at the junction of multiple paths of computation flow of the redefined variable and match the correct definition of the redefined variable by utilizing the route selector.

Figure 4:
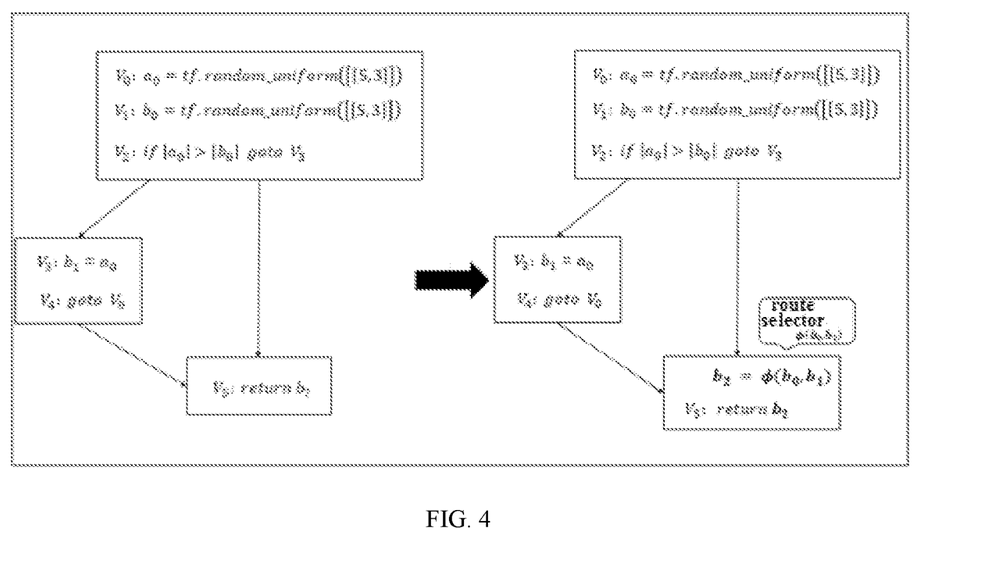
FIG. 4 is a schematic diagram of inserting a route selector for a redefined variable facing a multi-path computation flow graph in compiling according to the embodiment of the disclosure.

With reference to FIG. 4, it is a schematic diagram of inserting a route selector for a redefined variable facing a multi-path computation flow graph in compiling. As shown on the left in FIG. 4, a definition of a redefined variable b at a node $V_5$ can only be determined to copy a variable $b_0$ at the node $V_1$ or a variable $b_1$ at a node $V_3$ in the operation phase of the computation graph. When the definition of the redefined variable b at the node $V_5$ faces the multi-path computation flow graph, a route selector φ function as shown on the right in FIG. 4 needs to be inserted and the definition of the redefined variable b at the node $V_5$ is updated by using a matching result of the route selector.

Defining the route selector for the redefined variable includes the following definitions:

A condition of inserting the route selector is defined;

When a predecessor node of a junction node of multiple paths of computation flow of the computation graph constitutes two or more different sub-graphs and each of the sub-graphs includes a definition node of the redefined variable, a condition 1 and a condition 2 are simultaneously satisfied and the route selector for the redefined variable is inserted at the definition node of the redefined variable of the computation graph;

The condition 1 is that connecting edges exist between the different sub-graphs and the junction node of multiple paths of computation flow of the computation graph and the connecting edges have a unique common node which is the junction node of multiple paths of computation flow of the computation graph; and The condition 2 is that in one time of execution flow of the computation graph, the junction node of multiple paths of computation flow of the computation graph cannot simultaneously flow through the connecting edges between the different sub-graphs and the junction node of multiple paths of computation flow of the computation graph and can only select one of the connecting edges.

Figure 5:
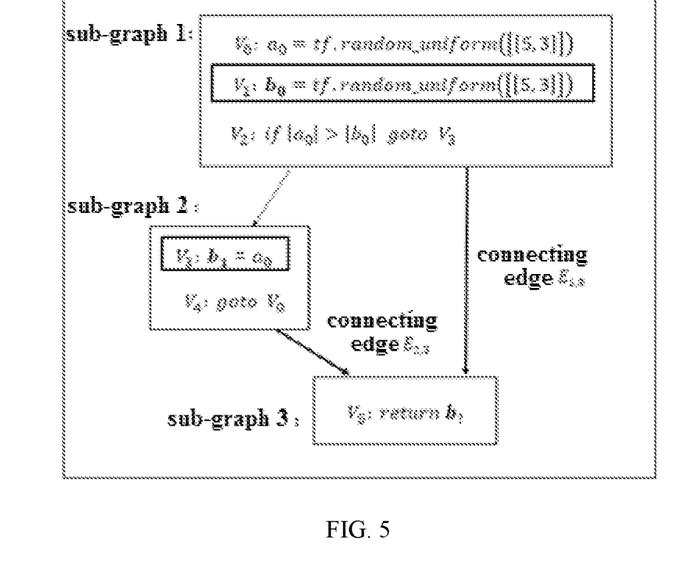
FIG. 5 is a schematic diagram of defining a condition of inserting the route selector according to the embodiment of the disclosure.

With reference to FIG. 5, it is a schematic diagram of defining a condition of inserting the route selector, a sub-graph 3 is the junction node of multiple paths of computation flow of the computation graph and contains a use expression of the redefined variable b. As long as the following conditions are satisfied, the route selector for the redefined variable b can be inserted:

Condition 1: a sub-graph 1 and a sub-graph 2 exist, the node $V_1$ and the node $V_3$ of the definition of the redefined variable are respectively included in the sub-graphs, and two connecting edges between the sub-graph 1 and the sub-graph 2 and the junction node of multiple paths of computation flow of the computation graph are a connecting edge $E_{1,3}$ and a connecting edge $E_{2,3}$, respectively; and Condition 2: in one time of execution flow of the computation graph, the junction node $V_5$ of multiple paths of computation flow of the computation graph cannot simultaneously flow through the connecting edge $E_{1,3}$ and the connecting edge $E_{2,3}$ between different sub-graphs and the junction node of multiple paths of computation flow of the computation graph and can only select one of the connecting edge $E_{1,3}$ and the connecting edge $E_{2,3}$.

A dominance attribute of the computation graph is defined; and

All paths of the execution flow of the computation graph in the process of flowing to a node from a root node of the computation graph pass through the junction node of multiple paths of computation flow of the computation graph.

Figure 6:
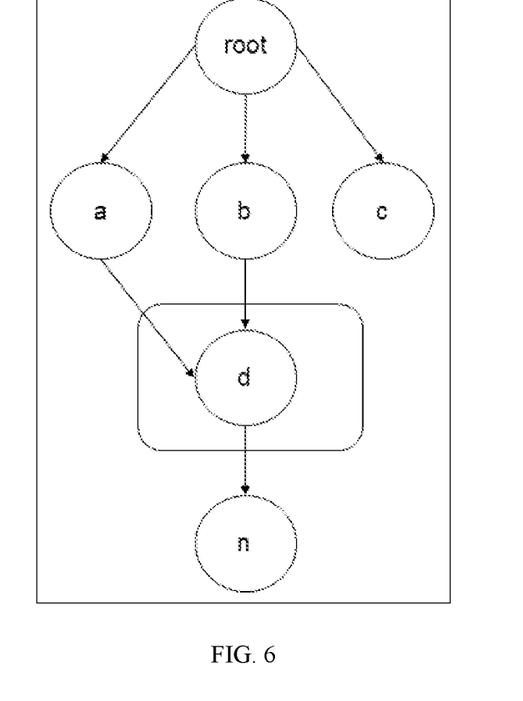
FIG. 6 is a schematic diagram of defining a dominance attribute of the computation graph according to the embodiment of the disclosure.

With reference to FIG. 6, it is a schematic diagram of defining a dominance attribute of the computation graph. A definition of dominating a node n by a node d in the computation graph is that: all paths of the execution flow in the process of flowing to the node n from the root node of the computation graph can pass through the node d.

The rigorous computation graph is defined;

For a node without the route selector, a definition of the redefined variable certainly exists in a predecessor node to dominate the node; and For a node with the route selector, a plurality of definitions of the redefined variable certainly exist and a corresponding definition on the redefined variable dominates a predecessor node corresponding to the node with the route selector.

Figure 7:
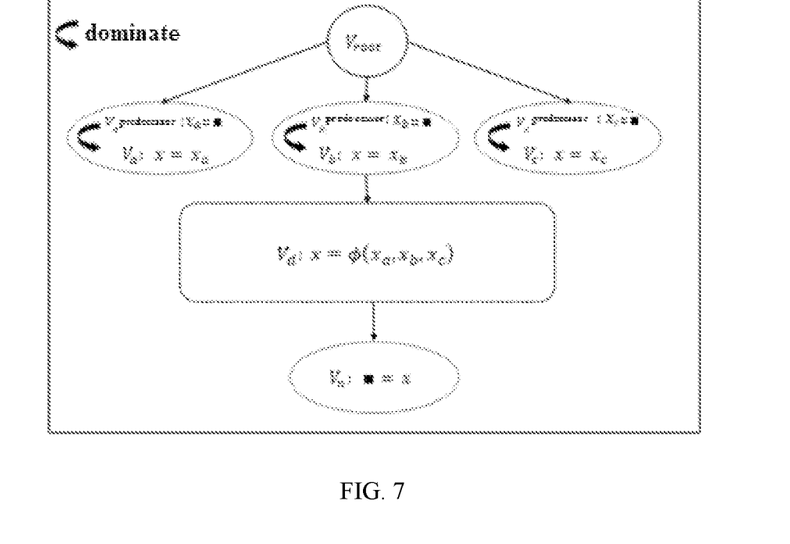
FIG. 7 is a schematic diagram of dominating a predecessor node corresponding to a node with the route selector by a definition corresponding to a redefined variable in compiling according to the embodiment of the disclosure.

With reference to FIG. 7, it is a schematic diagram of dominating the predecessor node corresponding to the node with the route selector by the definition corresponding to the redefined variable in compiling. For a node x with the route selector, a plurality of definitions $x_a$, $x_b$, and $x_c$ of the variable exist. The definition $x_a$, $x_b$, and $x_c$ corresponding to the variable x respectively dominate predecessor nodes $V_a$, $V_b$, and $V_c$ of the node $V_d$.

Figure 8:
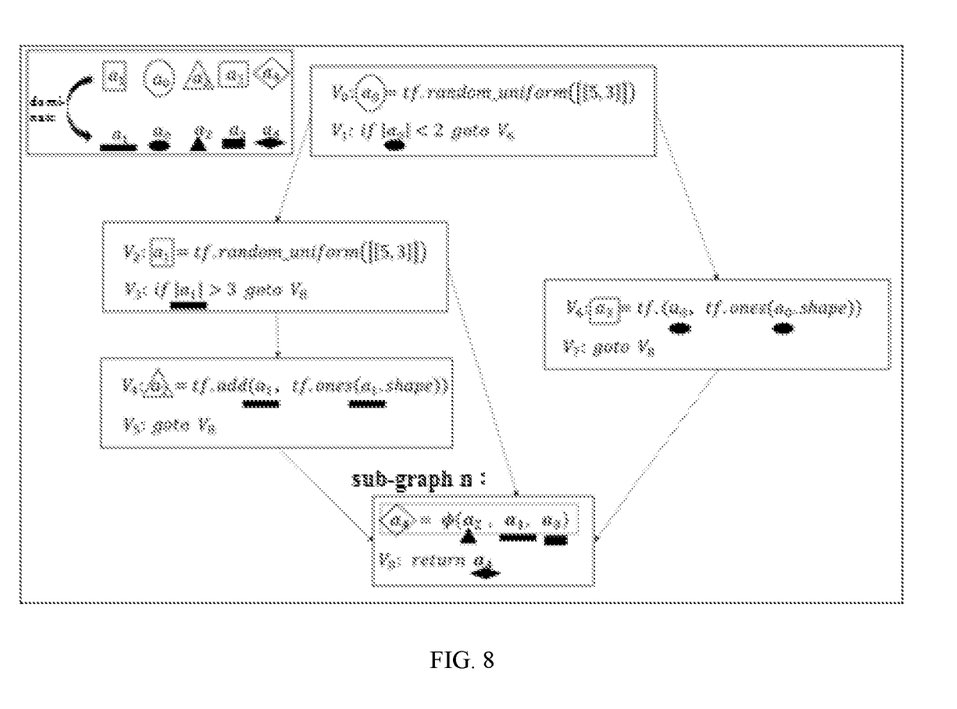
FIG. 8 is a schematic diagram of defining the rigorous computation graph according to the embodiment of the disclosure.

With reference to FIG. 8, it is a schematic diagram of defining the rigorous computation graph:
1. Variables $a_2$, $a_1$, and $a_3$ respectively are three parameters of the route selector for the redefined variable a. Definitions of the variables $a_2$, $a_1$, and $a_3$ respectively dominate predecessor nodes of a sub-graph n including use expressions of the variables $a_2$, $a_1$, and $a_3$.
2. In a case that the variable $a_0$ is used outside the route selector node of the variable a, the node V0 including the definition of the variable $a_0$ certainly dominates a node of the sub-graph n.

S4: the route selector for the redefined variable is solved;

S41: a copy node of the correct definition of the redefined variable is inserted at a non-key edge of the computation graph: an output variable of the route selector is inserted at the non-key edge of the computation graph to take over the copy node of the correct definition of the redefined variable;

S42: a key edge of the computation graph is decomposed: a blank node is added at the key edge of the computation graph;

A definition of the key edge of the computation graph is that: a start node of the connecting edge has a plurality of successor nodes, and meanwhile, a tail node of the connecting edge has a plurality of predecessor nodes.

S43: the copy node of the correct definition of the redefined variable is inserted at the key edge of the computation graph: the output variable of the route selector is inserted at the position of a predecessor node of the blank node in the step S42 to take over the copy node of the correct definition of the redefined variable; and S44: the node of the route selector inserted at the junction of multiple paths of computation flow in the computation graph is removed: when the route selector of the correct definition of the redefined variable is de-structured by the step S42 and the step S43, the correct definition node of the redefined variable is inserted into the predecessor node corresponding to the junction node of the multiple paths of computation flow.

Figure 9:
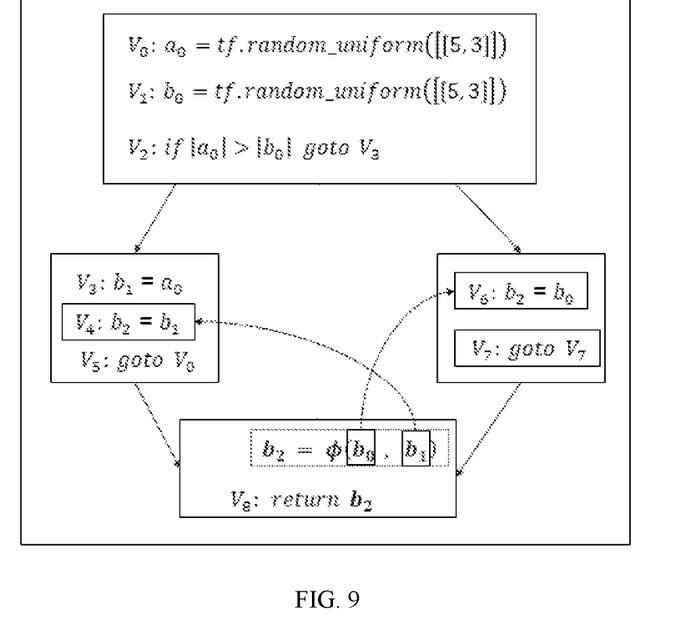
FIG. 9 is a schematic diagram of the process of solving the route selector for the redefined variable according to the embodiment of the disclosure.

With reference to FIG. 9, it is a schematic diagram of the process of solving the route selector for the redefined variable:

1. Firstly, a copy node $V_4$, taken over by the output variable of the route selector, of the correct definition of the redefined variable is inserted at the non-key edge of the computation graph, i.e., an edge that connects the node $V_3$ and the node $V_5$.
2. The key edge of the computation graph, i.e., an edge that connects the node $V_2$ and the node $V_5$, is decomposed. A blank node $V_7$ is added at the key edge.
3. The output variable of the route selector is inserted at the position of a predecessor node of the blank node $V_7$ to take over a copy node $V_6$ of the correct definition of the redefined variable.
4. A node $b_2=\phi(b_0, b_1)$ of the route selector inserted at the junction of multiple paths of computation flow in the computation graph is removed.

S5: a criterion of inserting the route selector for the redefined variable into the node is defined;

S51: it is defined that the node $V_1$ rigorously dominates the node $V_2$; the node $V_1$ dominates the node $V_2$, the node $V_1$ is a predecessor node of the node $V_2$, and $V_1 \ne V_2$; and S52: a dominating edge of the node $V_1$ is defined: the dominating edge includes a set of all nodes $V_i$ that satisfy the following conditions: the node $V_1$ dominates a predecessor node of the node $V_i$, and the node $V_1$ does not rigorously dominate the node $V_i$.

Figure 10:
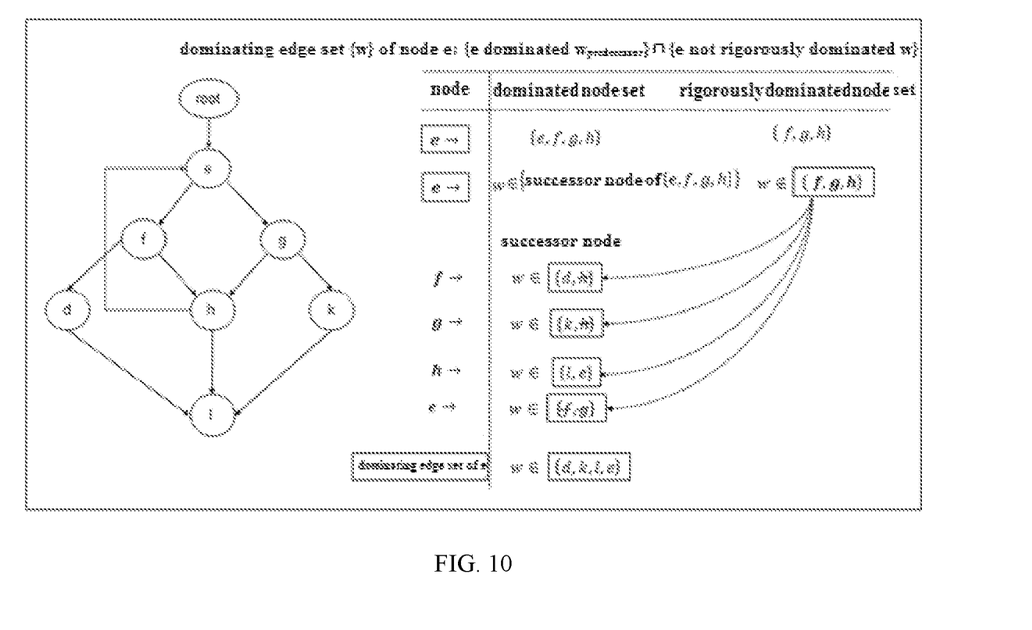
FIG. 10 is a schematic diagram of analyzing a dominating edge set of the node for the redefined variable according to the embodiment of the disclosure.

S6: a dominating edge set of the node for the redefined variable is analyzed;

S61: a dominating edge of the start node including the redefined variable is analyzed, and an insertion position of the route selector for the redefined variable at the random node is a dominating edge set of the nodes; and S62: a successor node of the start node is iterated until no node requires the route selector for the redefined variable;

The route selector on the redefined variable is the definition on the redefined variable per se, so the dominating edge criterion has to be iterated;

With reference to FIG. 10, it is a schematic diagram of analyzing the dominating edge set of the node for the redefined variable;

The process of analyzing a dominating edge set {e} of a node e is as follows:

S1: a dominated node set {e, f, g, h} of the node e is analyzed;

S2: a rigorously dominated node set {f, g, h} of the node e is analyzed;

S3: a first round of iteration is carried out: a successor node set {f, g} of the node e is analyzed:

S3.1: the successor node set e∈{f, g} of the node e is analyzed; and

S3.2: a rigorously dominated node set e∈{ } of the node e is removed from the successor node set of the node e;

S4: a second round of iteration is carried out: a successor node of the successor node set {f, g} of the node e, a successor node set {d, h} of a node f, and a successor node set {k, h} of a node g are analyzed:

S4.1: the successor node set {d, h} of the node f is iterated;

S4.2: a rigorously dominated node set e∈{d} of the node e is removed from the successor node set of the node f;

S4.3: the successor node set {k, h} of the node g is iterated; and

S4.4: a rigorously dominated node set e∈{k} of the node e is removed from the successor node set of the node g;

S5: a third round of iteration is carried out: successor nodes of the node set {d, h} and the node set {k, h} are analyzed:

S5.1: a successor node set {l, e} of a node his analyzed;

S5.2: a rigorously dominated node set e∈{l, e} of the node e is removed from the successor node set of the node h;

S5.3: a successor node set {l} of the node d is analyzed;

S5.4: a rigorously dominated node set e∈{l} of the node e is removed from the successor node set of the node d;

S5.5: a successor node set {l} of a node k is iterated; and

S5.6: the rigorously dominated node set e∈{l} of the node e is removed from the successor node set of the node k;

S6: a fourth round of iteration is carried out: successor nodes of the node set {l, e} and the node set {l} are analyzed:

S6.1: a successor node set { } of a node l is analyzed;

S6.2: the successor node set e∈{f, g} of the node e is analyzed; and

S6.3: the rigorously dominated node set e∈{ } of the node e is removed from the successor node set of the node e;

S7: a dominating edge set of the node e is that:
{removal of the rigorously dominated node set of the node e from the successor node set of the node f}
U{removal of the rigorously dominated node set of the node e from the successor node set of the node g}
U{removal of the rigorously dominated node set of the node e from the successor node set of the node (h, d, k)}
U{removal of the rigorously dominated node set of the node e from the successor node set of the node e}.

Therefore, the dominating edge set of the node e is that:
{e}={d} U{k}U {l, e} U{ }={d, k, l, e}.

S7: the route selector for the redefined variable is inserted.

When a node includes the correct definition of any one redefined variable, one route selector for the redefined variable is inserted at any node at the dominating edge of the any one redefined variable.

Figure 11:
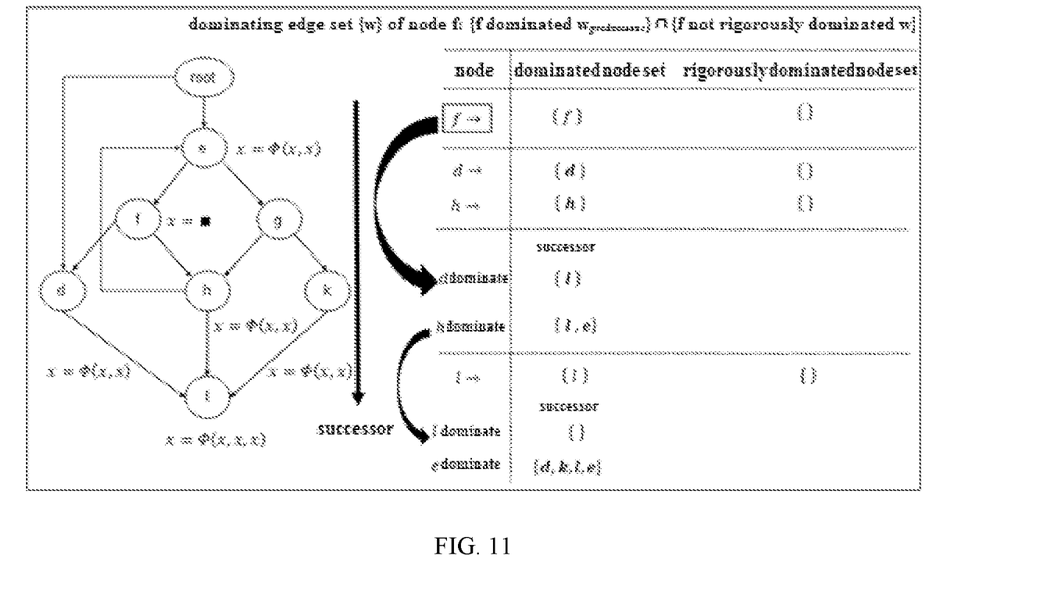
FIG. 11 is a schematic diagram of analyzing the dominating edge set of the node for the redefined variable and inserting the route selector for the redefined variable according to the embodiment of the disclosure.

With reference to FIG. 11, it is a schematic diagram of analyzing the dominating edge set of the node for the redefined variable and inserting the route selector for the redefined variable, and the process is as follows:

S1: a dominated node set {f} of the node f is analyzed;

S2: a rigorously dominated node set { } of the node f is analyzed;

S3: a first round of iteration is carried out: successor nodes of the node f are analyzed: a dominating edge set {d, h} of the node f is analyzed, and route selectors $x=\Phi(x, x)$ for x are respectively inserted at the nodes d and h;

S4: a second round of iteration is carried out: successor nodes of a successor node set {d, h} of the node f are analyzed:

S4.1: a dominated node set {d} of the node d is analyzed;

S4.2: a rigorously dominated node set { } of the node d is analyzed;

S4.3: a dominating edge set {l} of the node d is analyzed, and a route selector $x=\Phi(x, x, x)$ for x is inserted at the node l;

S4.4: a dominated node set {h} of the node h is analyzed;

S4.5: a rigorously dominated node set { } of the node h is analyzed; and

S4.6: a dominating edge set {l, e} of the node h is analyzed, and a route selector $x=\Phi(x, x)$ for x is inserted at the node e;

S5: a third round of iteration is carried out: successor nodes of a successor node set {l} of the node d and a successor node set {l, e} of the node h are analyzed;

S5.1: a successor node set { } of the node l is analyzed; and

S5.2: a dominating edge set { } of the node l is analyzed

S5.3: a dominating edge set {d, k, l, e} of the node e is analyzed, and a route selector x=Φ(x, x) for x is inserted at the node k.

S8: the redefined variable is renamed; and

Renaming is carried out on a variable output by the inserted route selector for the redefined variable.

Figure 12:
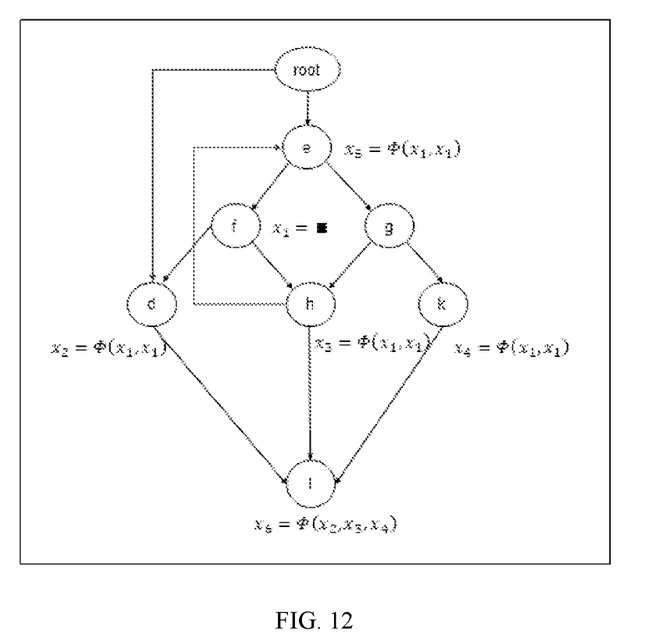
FIG. 12 is a schematic diagram of renaming a variable output by the inserted route selector for the redefined variable after compiling according to the embodiment of the disclosure.

With reference to FIG. 12, it is a schematic diagram of renaming the variable output by the inserted route selector for the redefined variable. With respect to the redefined variable at the node f, renaming needs to be carried out at nodes of the dominating edge set of the node f, i.e., the redefined variable x is respectively renamed at nodes d, h, e, k, and l.

Corresponding to the above-mentioned embodiment of the graph compiling and optimization method for neural network computation, the disclosure further provides an embodiment of a graph compiling and optimization apparatus for neural network computation.

Figure 13:
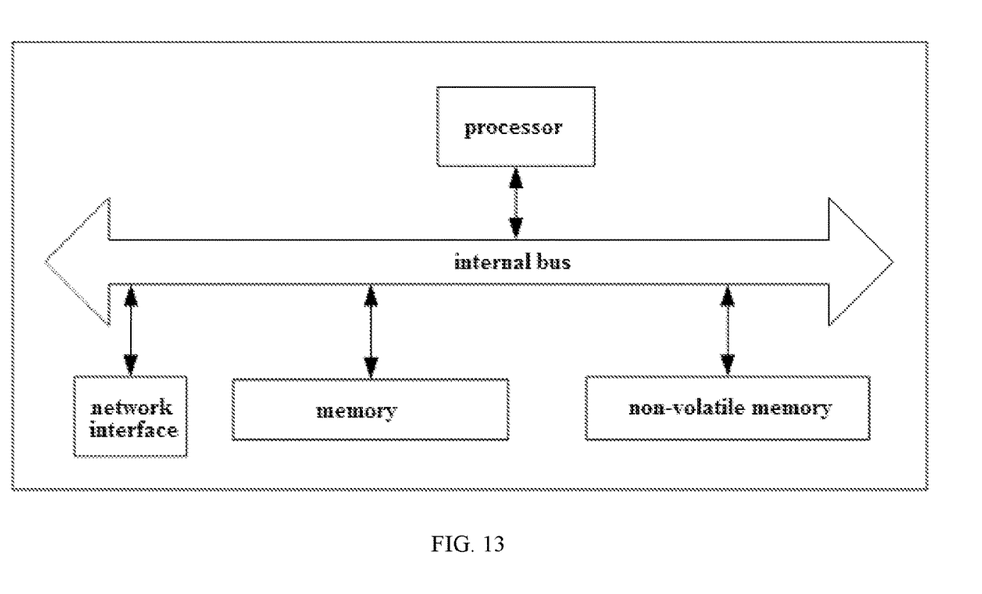
FIG. 13 is a structure diagram of a graph compiling and optimization apparatus for neural network computation according to the disclosure.

With reference to FIG. 13, a graph compiling and optimization apparatus for neural network computation, as provided by an embodiment of the disclosure, includes a memory and one or more processors. An executable code is stored in the memory, and the one or more processors are configured to implement the graph optimization method for neural network computation in the embodiment above when executing the executable code.

The embodiment of the graph compiling and optimization apparatus for neural network computation of the disclosure can be applied on a random device with the data processing capacity. The random device with the data processing capacity may be a device or an apparatus such as a computer and the like. An apparatus embodiment may be implemented by software, or may be implemented by hardware or in a software and hardware combined mode. By taking software implementation as an example, in a logical sense, the apparatus is formed by reading a corresponding computer program instruction in a non-volatile memory into a memory for operation through a processor of the random device with the data processing capacity where the apparatus is located. In the hardware aspect, as shown in FIG. 13, it is a hardware structure diagram of the random device with the data processing capacity where the graph optimization apparatus for neural network computation is located according to the disclosure, and besides the processor, the memory, a network interface, and the non-volatile memory as shown in FIG. 13, the random device with the data processing capacity where the apparatus in the embodiment is located commonly may also include other hardware according to the actual functions of the random device with the data processing capacity, which is not repeated herein.

The implementing process of the function and the effect of each unit in the apparatus above specifically refers to the implementing process of the corresponding step in the method above, and will not be repeated herein.

The apparatus embodiment basically corresponds to the method embodiment, and thus, the related description can refer to part of the description of the method embodiment. The apparatus embodiment described above is merely exemplary, wherein the units illustrated as separate parts may be or may be not physically separated, and as unit display parts, may be or may be not physical units, i.e., may be located in one place, or may be distributed on a plurality of network units. Part or all of modules of the apparatus may be selected according to actual demands to fulfill the aim of the solution of the disclosure. Those ordinary skilled in the art can understand and implement without any inventive work.

An embodiment of the disclosure further provides a computer readable storage medium storing a program. When the program is executed by a processor, the graph optimization method for neural network computation in the embodiment above is implemented.

The computer readable storage medium may be an internal storage unit, e.g., a hard disk or a memory, of the random device with the data processing capacity according to any one of the embodiments above. The computer readable storage medium may also be an external storage device of the random device with the data processing capacity, such as a plug-in type hard disk, a Smart Media Card (SMC), a SD card, a flash card, and the like equipped on the device. Further, the computer readable storage medium may also include not only the internal storage unit, but also the external storage device of the random device with the data processing capacity. The computer readable storage medium is configured to store the computer program and other programs and data required by the random device with the data processing capacity, or may be configured to temporarily store data which has been output or is to output.

The above are only the preferred embodiments of the disclosure and not intended to limit the disclosure. Those skilled in the art can make various modifications and changes to the disclosure. Any modifications, equivalent replacements, improvements and the like within the spirit and principle of the disclosure shall fall within the scope of protection of the disclosure.

What is claimed is:

1. A graph compiling and optimization method for neural network computation, comprising the following steps:
   S1: converting a computation graph: converting a neural network computation graph for neural network computation into a computation graph in a global single-node defining mode;
   S2: allocating a register of a computer memory: allocating the register of the computer memory for a variable at a node of the computation graph;
   S3: defining a route selector for a redefined variable, and selecting a correct definition of the redefined variable at the node of the computation graph according to a path through which execution flow flows in the operation phase of the computation graph;
   S4: solving the route selector for the redefined variable;
   S41: inserting a copy node of the correct definition of the redefined variable at a non-key edge of the computation graph: inserting an output variable of the route selector at the non-key edge of the computation graph to take over the copy node of the correct definition of the redefined variable;
   S42: decomposing a key edge of the computation graph: adding a blank node at the key edge of the computation graph;
   S43: inserting the copy node of the correct definition of the redefined variable at the key edge of the computation graph: inserting the output variable of the route selector at the position of a predecessor node of the blank node in the step S42 to take over the copy node of the correct definition of the redefined variable; and
   S44: removing the node with the route selector inserted at the junction of multiple paths of computation flow in the computation graph: when the route selector of the correct definition of the redefined variable is de-structured by the step S42 and the step S43, inserting a correct definition node of the redefined variable into the predecessor node corresponding to the junction node of the multiple paths of computation flow;

S5: defining a criterion of inserting the route selector for the redefined variable into the node;

S6: analyzing a dominating edge set of a node for the redefined variable;

S7: inserting the route selector for the redefined variable; and

S8: renaming the redefined variable.

2. The graph compiling and optimization method for neural network computation according to claim 1, wherein the step S1 specifically comprises the following sub-steps:

S11: recording a name of a variable defined at a start node of the neural network computation graph for neural network computation where all variables are located; and S12: traversing the neural network computation graph for neural network computation according to a topological sequence of the neural network computation graph for neural network computation, and whenever a successor node redefining the variable exists, generating a new name for the variable to obtain the computation graph in the global single-node defining mode.

3. The graph compiling and optimization method for neural network computation according to claim 1, wherein the step S2 specifically comprises the following sub-steps:

S21: analyzing a life cycle of the variable at the node of the computation graph; and S22: allocating the register for the variable according to the life cycle, and when the life cycle corresponding to the variable has no conflict, enabling the variable with the non-conflict life cycle to multiplex the same register.

4. The graph compiling and optimization method for neural network computation according to claim 1, wherein in the step S3, in the computation graph intermediate representation, during the corresponding selection of a correct route when the redefined variable faces multiple paths of computation flow, the route selector is inserted at a junction of the multiple paths of computation flow of the redefined variable, and the correct definition of the redefined variable is matched by utilizing the route selector.

5. The graph compiling and optimization method for neural network computation according to claim 1, wherein the step S3 of defining the route selector for the redefined variable comprises the following definitions:

defining a condition of inserting the route selector;

defining a dominance attribute of the computation graph; and defining the rigorous computation graph.

6. The graph compiling and optimization method for neural network computation according to claim 5, wherein defining the condition of inserting the route selector specifically is that: when a predecessor node of a junction node of multiple paths of computation flow of the computation graph constitutes two or more different sub-graphs and each of the sub-graphs comprises a definition node of the redefined variable, a condition 1 and a condition 2 are simultaneously satisfied and the route selector for the redefined variable is inserted at the definition node of the redefined variable of the computation graph;

the condition 1 is that connecting edges exist between the different sub-graphs and the junction node of multiple paths of computation flow of the computation graph and the connecting edges have a unique common node which is the junction node of multiple paths of computation flow of the computation graph; and the condition 2 is that in one time of execution flow of the computation graph, the junction node of multiple paths of computation flow of the computation graph cannot simultaneously flow through the connecting edges between the different sub-graphs and the junction node of multiple paths of computation flow of the computation graph and can only select one of the connecting edges.

7. The graph compiling and optimization method for neural network computation according to claim 5, wherein defining the dominance attribute of the computation graph specifically is that: all paths of the execution flow of the computation graph in the process of flowing to a node from a root node of the computation graph pass through the junction node of multiple paths of computation flow of the computation graph.

8. The graph compiling and optimization method for neural network computation according to claim 5, wherein defining the rigorous computation graph specifically is that:

for a node without the route selector, a definition of the redefined variable certainly exists in a predecessor node to dominate the node; and for a node with the route selector, a plurality of definitions of the redefined variable certainly exist and a corresponding definition of the redefined variable dominates a predecessor node corresponding to the node with the route selector.

9. The graph compiling and optimization method for neural network computation according to claim 1, wherein the step S5 specifically comprises the following sub-steps:

S51: defining that a node $V_1$ rigorously dominates a node $V_2$, wherein the node $V_1$ dominates the node $V_2$, the node $V_1$ is a predecessor node of the node $V_2$, and $V_1 \neq V_2$; and S52: defining a dominating edge of the node $V_1$, the dominating edge comprising a set of all nodes $V_i$ that satisfy the following conditions: the node $V_1$ dominates a predecessor node of the node $V_i$, and the node $V_1$ does not rigorously dominate the node $V_i$.

10. The graph compiling and optimization method for neural network computation according to claim 1, wherein the step S6 specifically comprises the following sub-steps:

S61: analyzing a dominating edge of the start node comprising the redefined variable, an insertion position of the route selector for the redefined variable at the random node being a dominating edge set of the node; and S62: iterating a successor node of the start node until no node requires the route selector for the redefined variable.

11. The graph compiling and optimization method for neural network computation according to claim 1, wherein the step S7 specifically comprises: when a node comprises the correct definition of any one redefined variable, inserting one route selector for the redefined variable at any node at the dominating edge of the any one redefined variable.

12. The graph compiling and optimization method for neural network computation according to claim 1, wherein the step S8 specifically comprises: carrying out renaming on a variable output by the inserted route selector for the redefined variable.

13. A graph compiling and optimization apparatus for neural network computation, comprising a memory and one or more processors, an executable code being stored in the memory, and the one or more processors being configured to implement the graph optimization method for neural network computation according to claim 1, when executing the executable code.

14. A non-transitory computer readable storage medium, storing a program, when the program is executed by a processor, the graph compiling and optimization method for neural network computation according to claim 1 being implemented.

* * * * *